United States Patent
Garcia et al.

(10) Patent No.: US 10,074,263 B1
(45) Date of Patent: Sep. 11, 2018

(54) VEHICLE SAFETY SYSTEM AND METHOD OF USE

(71) Applicants: Miguel Angel Garcia, Fort Worth, TX (US); Jorge Ayala H., Fort Worth, TX (US)

(72) Inventors: Miguel Angel Garcia, Fort Worth, TX (US); Jorge Ayala H., Fort Worth, TX (US)

(*) Notice: Subject to any disclaimer, the term of this patent is extended or adjusted under 35 U.S.C. 154(b) by 0 days.

(21) Appl. No.: 15/281,247

(22) Filed: Sep. 30, 2016

Related U.S. Application Data

(60) Provisional application No. 62/235,199, filed on Sep. 30, 2015.

(51) Int. Cl.
*G08B 21/24* (2006.01)
*B60Q 5/00* (2006.01)
*B60R 21/015* (2006.01)

(52) U.S. Cl.
CPC ............ *G08B 21/24* (2013.01); *B60Q 5/005* (2013.01); *B60R 21/01542* (2014.10)

(58) Field of Classification Search
CPC .... G08B 21/24; B60Q 5/005; B60R 21/01542
See application file for complete search history.

(56) References Cited

U.S. PATENT DOCUMENTS

| | | | | |
|---|---|---|---|---|
| 6,922,622 | B2* | 7/2005 | Dulin | B06B 1/0215 180/272 |
| 9,384,647 | B1* | 7/2016 | Arnold | G08B 21/02 |
| 9,552,717 | B1* | 1/2017 | Rudolph | G08B 21/24 |
| 9,741,224 | B1* | 8/2017 | Singh | H04W 4/14 |
| 9,847,004 | B1* | 12/2017 | Lan | G08B 21/0263 |
| 2003/0189165 | A1* | 10/2003 | Samuels, Sr. | B60N 2/0244 250/221 |
| 2015/0279195 | A1* | 10/2015 | Qian | G08B 21/24 340/540 |
| 2015/0294169 | A1* | 10/2015 | Zhou | A61B 5/18 348/148 |
| 2017/0282822 | A1* | 10/2017 | Hunter, Jr. | B60R 22/105 |

* cited by examiner

*Primary Examiner* — Frederick M Brushaber
(74) *Attorney, Agent, or Firm* — Eldredge Law Firm, LLC; Richard Eldredge

(57) ABSTRACT

A method to notify a third party if a child is left behind in a vehicle includes securing a motion detector system within a vehicle, the motion detector being secured to a roof of an inner cabin of the vehicle and directed to a rear seat; detecting via the motion detector if a child is left behind in the rear seat after the vehicle is locked and after a driver exits; if the child is left behind, activating an air conditioner via a computer system operably associated with the motion detector; after activating the air conditioner, detecting if the driver has returned to the vehicle; if the driver has not returned, activating a car alarm via the computer system; after activating the car alarm for a predetermined time, determining if the driver has returned; and if the driver has not returned, notifying a third party via a transceiver operably associated with computer system.

3 Claims, 4 Drawing Sheets

VEHICLE SAFETY SYSTEM AND METHOD OF USE

BACKGROUND

1. Field of the Invention

The present invention relates generally to safety systems, and more specifically, to a vehicle safety system for reducing the risk of children being left alone in a vehicle.

2. Description of Related Art

Vehicle safety systems are well known in the art and are effective means to reduce potential injury to children riding in vehicles. For example, FIG. 1 depicts a conventional vehicle safety system 101, having a vehicle 102 in communication with a vehicle seat 103 in communication with a child safety seat 104. As shown in FIG. 2, the child safety seat 104 securely attaches to a base 201, which securely attaches to the vehicle seat 103. During use, an infant (not shown) is placed inside of the child safety seat 104.

One of the problems commonly associated with system 101 is its low noticeability. For example, the child safety seat 104 is used in conjunction with the back seat of a vehicle 102 and is therefore easy for the driver or parent to forget about. This creates the risk that a parent will forget about an infant in the child safety seat 104, which can lead to serious injury or death.

Accordingly, although great strides have been made in the area of vehicle safety systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
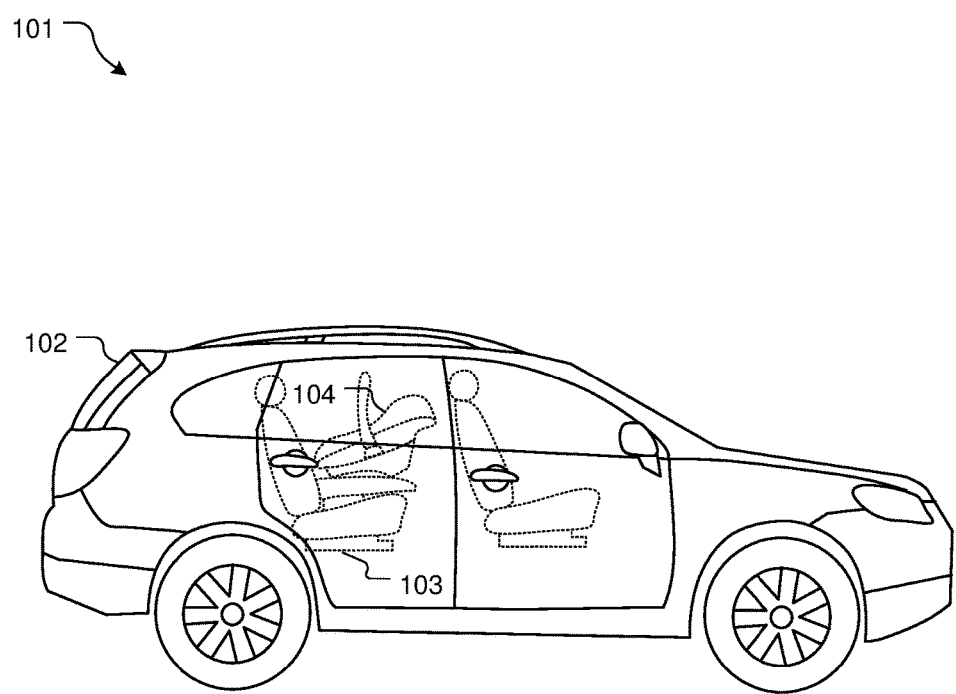
FIG. 1 is a side view of a common vehicle safety system.
Figure 2:
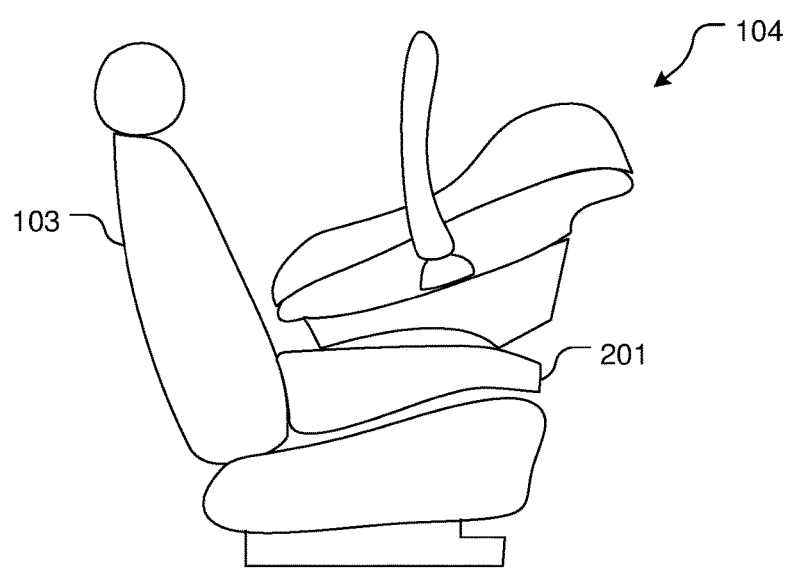
FIG. 2 is a side view of the vehicle seat and child safety seat from FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional vehicle safety systems. Specifically, the present invention decreases the risk that a child will be forgotten in a vehicle. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 3:
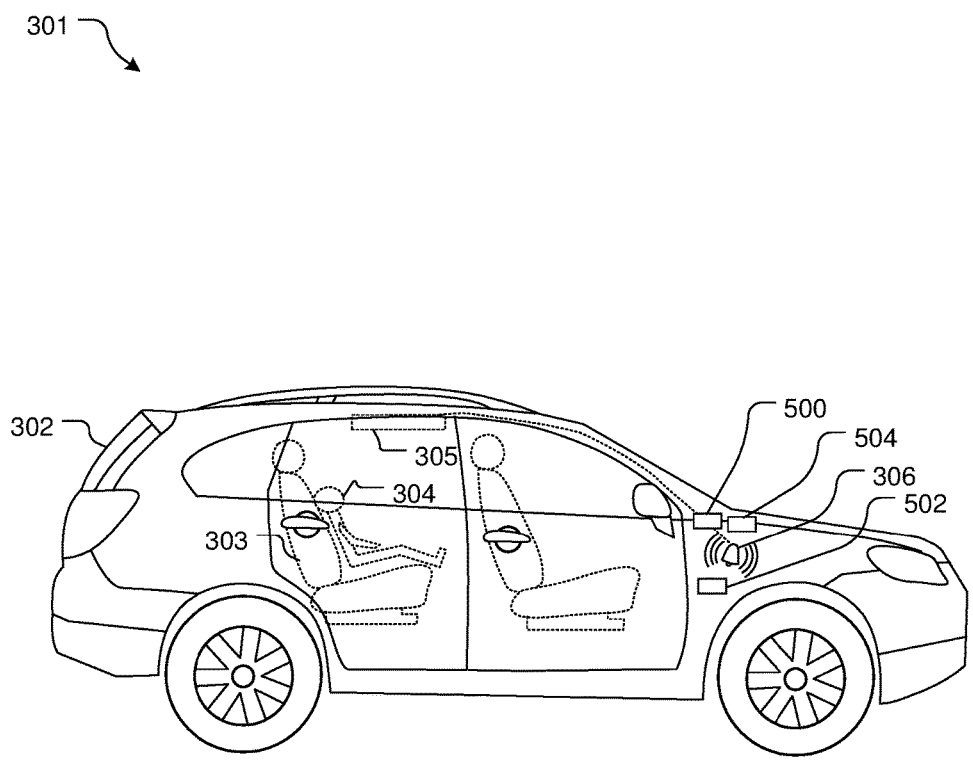
FIG. 3 is a side view of a vehicle safety system in accordance with a preferred embodiment of the present application.

Referring now to the drawings wherein like reference characters identify corresponding or similar elements throughout the several views, FIG. 3 depicts a side view of a vehicle safety system in accordance with a preferred embodiment of the present application. It will be appreciated that system 301 overcomes one or more of the above-listed problems commonly associated with conventional vehicle safety systems.

Figure 4:
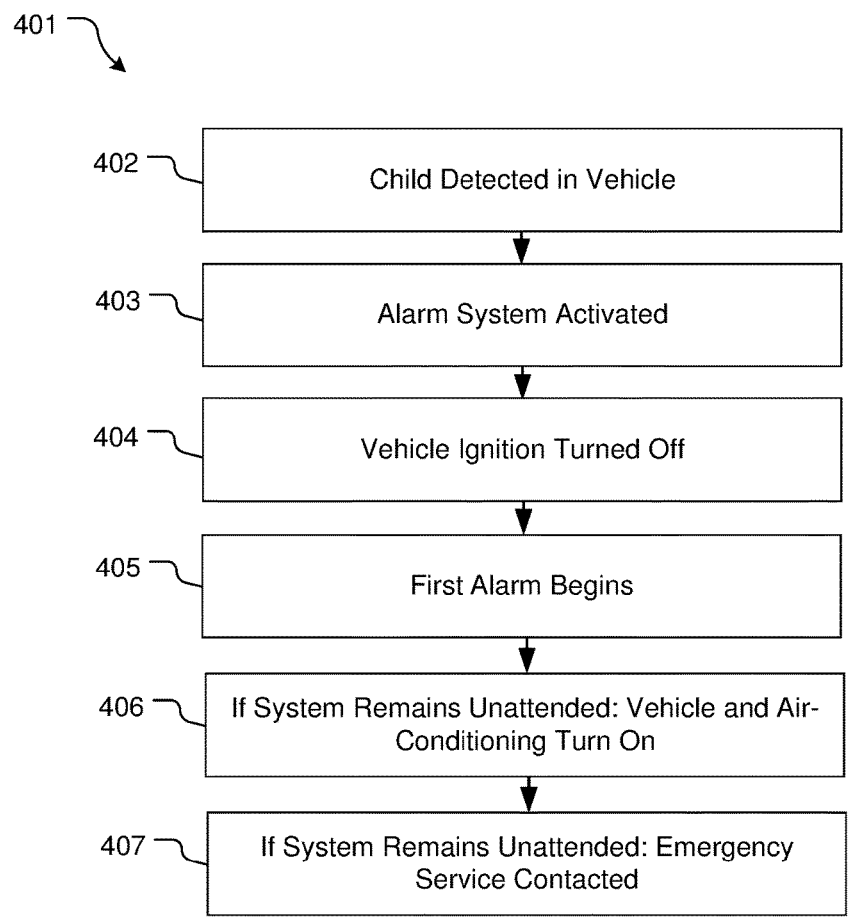
FIG. 4 is a flowchart of the process of FIG. 3.

In the contemplated embodiment, system 301 includes a vehicle 302 in communication with a vehicle seat 303 and an occupant 304, as well as a motion detector sensor 305 in communication with a computer system 500, which in turn is operably associated with the engine ignition system 502, the vehicle alarm system 306, and a transceiver configured to wirelessly notify third parties, e.g., police officers. In FIG. 4, a flowchart 401 depicts a preferred process of system 301. During use, when an occupant 304 enters the vehicle 302, the motion detector 305 activates the alarm system 306, as shown with boxes 402 and 403. When the vehicle ignition is turned off, a first alarm begins signaling, as shown with boxes 404 and 405. If the driver or parent does not attend the first alarm in a pre-set time frame, the vehicle and vehicle air conditioner will turn on, as shown with box 406. If the alarm system 306 continues to remain unattended, an emergency service will be contacted, as shown with box 407.

It should be appreciated that one of the unique features believed characteristic of the present application is the sequence of notifications comprising an immediate alarm, followed by the vehicle start up, and further followed by an emergency service call. It is understood that this sequence will occur within a pre-set time frame, which is understood to decrease the risk of injury to children, animals, or other vehicle occupants likely to be trapped in the vehicle.

It is contemplated and should be appreciated that the first alarm can comprise any continuous alert such as beeping, clicking, or flashing light. In addition, it is contemplated that system 301 can comprise additional elements such as a thermometer for vehicle temperature recording, activation of the vehicle heater when appropriate, a method of lowering windows, and alternate forms of occupant detection, such as seat belt sensors in communication with the alarm system. Alternative embodiments further contemplate that the motion detector 305 and alarm system 306 can stand alone or be manufactured into a vehicle.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method to notify a third party if a child is left behind in a vehicle, comprising in a functional order:

securing a motion detector system within a vehicle, the motion detector being secured to a roof of an inner cabin of the vehicle and is directed to a rear seat;

detecting via the motion detector if a child is left behind in the rear seat solely after two requirements are determined: (1) the vehicle is locked; and (2) after a driver exits;

if after it is determined that the vehicle is locked and after the driver exits and that the child is left behind, as determined by the motion detector system, a computer system in data communication with the motion detector is configured to turn on an air conditioner of the vehicle;

after activating the air conditioner of the vehicle, detecting if the driver has returned to the vehicle;

if the driver has not returned to the vehicle, the computer system is configured to activate a car alarm;

after activating the car alarm for a predetermined time, determining if the driver has returned to the vehicle; and if the driver has not returned, notifying a third party via a transceiver operably associated with computer system.

2. The method of claim 1, further comprising:

sounding an audible alarm after detecting if the child is in the rear seat and after the car engine is turned off.

3. The method of claim 2, wherein the audible alarm is manually turned off.

* * * * *